United States Patent [19]

McCartney, Jr.

[11] Patent Number: 4,633,143
[45] Date of Patent: Dec. 30, 1986

[54] CONVERGENCE CORRECTION APPARATUS FOR DELTA-GUN COLOR CATHODE RAY TUBE DISPLAYS

[75] Inventor: Richard I. McCartney, Jr., West Carrollton, Ohio

[73] Assignee: Sperry Corporation, New York, N.Y.

[21] Appl. No.: 499,573

[22] Filed: May 31, 1983

[51] Int. Cl.⁴ .................. G09G 1/04; H01J 29/70
[52] U.S. Cl. ............................ 315/368; 315/377; 315/382
[58] Field of Search ............... 315/377, 382, 368; 358/10

[56] References Cited

U.S. PATENT DOCUMENTS

| | | | |
|---|---|---|---|
| 3,379,923 | 4/1968 | Chandler et al. | 315/368 |
| 3,461,341 | 8/1969 | Egawa | 315/368 |
| 3,700,954 | 10/1972 | Egawa et al. | 315/368 |
| 3,761,763 | 9/1973 | Saruta | 315/368 X |
| 4,092,567 | 5/1978 | Sharrit | 315/377 |
| 4,249,175 | 2/1981 | Belrose et al. | 315/377 X |
| 4,371,813 | 2/1983 | Dollheimer et al. | 315/377 |
| 4,431,949 | 2/1984 | Wahlquist | 315/368 |
| 4,499,457 | 2/1985 | Hintze | 315/382 X |

FOREIGN PATENT DOCUMENTS 0594601 2/1978 U.S.S.R. ................ 315/368

Primary Examiner—Thomas H. Tarcza
Assistant Examiner—John B. Sotomayor
Attorney, Agent, or Firm—Howard P. Terry

[57] ABSTRACT

Convergence correction for a delta-gun CRT at all locations on the CRT screen is accomplished by separately implementing the general equation for convergence in that coordinate system peculiar to each of the gun's location relative to the screen and modifying the equation coefficients in each of its four quadrants to effect convergence in that quadrant. The quadrants of each of the gun's coordinate system is the same as the quadrants of the CRT screen thereby allowing each of the coefficients to be changed or adjusted only when the terms it multiplies is zero. Complete convergence correction for the entire screen may be accomplished using only nine screen locations. A unique triangular convergence symbol corresponding to the gun locations is placed at each of these nine locations to adjust the equation coefficients, each leg of the convergence symbol being of a color which optimizes the viewability of the convergence of a particular gun.

12 Claims, 6 Drawing Figures

CONVERGENCE CORRECTION APPARATUS FOR DELTA-GUN COLOR CATHODE RAY TUBE DISPLAYS

BACKGROUND OF THE INVENTION

1. Field of Invention

The present invention relates to delta-gun shadow mask type color cathode ray tubes (CRT) and more particularly to means for causing the electron beams from each of the delta-arranged guns to converge on a single shadow mask opening and, therefore, the phosphor triad on the display surface or screen of the CRT.

2. Description of the Prior Art

As is well known to those skilled in this art, the delta-gun, color cathode ray tube (CRT) differs most significantly from conventional CRT's having a single gun in that the delta-gun has three guns, each of which generate a distinct electron beam for exciting its corresponding phosphor dot of the red, green and blue dot triad matrix constituting the CRT display surface.

Each of the delta-arranged gun beams must land at precisely the same opening in the shadow mask at every point on the screen in order to produce a perfect rendition of a desired color and symbol shape. To achieve the desired rendition on the screen, the beams, substantially forward of where they leave the guns, are magnetically deflected, as a set, by excitation of a main deflection yoke comprising an electromagnet arrangement mounted around the neck of the CRT so as to control the angle at which the beams, as a set, approach the desired landing site on the display screen.

Registration of all three beams at the landing site cannot be accomplished through all deflection angles without some individual deflection of each beam in addition to the main deflection. The auxiliary deflection system is termed convergence deflection because of the function it performs in causing each beam to converge to a single point for all deflected angles.

Aside from the geometry errors (pin cushion effect) which necessitate a convergence system, there are errors due primarily to alignment tolerances associated with the deflection yoke and electron gun assemblies. These errors have the effect of distorting the ideal convergence function and consequently, each CRT assembly must be uniquely converged.

In most, if not all delta-gun CRT's, convergence deflection is accomplished by electrical current excitation of a small deflection yoke for each yoke is usually part of the electron gun assembly (See FIG. 1). Each of these yokes produce a magnetic field which is applied to the beam emanating from their respective gun in such a way that deflection of the beam is along a single axis, that is, the axis which extends radially from the center of the CRT, through the center of each of the three guns. These axes are called red radial, green radial and blue radial, for a typical CRT and are then, by the nature of the delta-gun, 120 angular degrees apart.

It is customary to align the blue radial with the vertical deflection of the main deflection yoke. Thus, as facing the front of the CRT, the blue gun converges along a vertical axis, red along an axis 120° left and green along an axis 120° to the right (240° to the left).

The full function of convergence is not possible without a fourth degree of freedom of movement associated with one of the electron beams. This is generally applied to the blue gun along the lateral axis of the CRT at 90° to the blue radial and is consequently termed blue lateral convergence.

As is the case with radial convergence, the blue lateral convergence can be partitioned into two components, a dynamic portion and a static, or constant portion. The cynamic portion of blue lateral correction (unlike that of the dynamic portion of the radial correction) can be, in general, performed by the design of the main deflection yoke. When this is the case, only an adjustable external static magnet is required to position the blue beam laterally to a reference location at the center of the screen. This magnetic adjustment is termed the static blue lateral adjustment.

In one prior display system which was developed using digital and analog hybrid circuitry, the screen was divided into 256 regions or cells and convergence for each gun was characterized by a digital word for each gun in each of the 256 locations. An analog circuit generated the major component of the convergence function and the digital word for each gun and location was converted to an analog equivalent to complete the convergence function.

Calibration of the hybrid system was accomplished by placing a symbol, having a color which consisted of combinations of two of the primary colors. The color of the symbol could be changed under operator control to give the three possible combinations of two guns (red blue, blue green, green red) and also the combination of three guns (white). In each cell, a potentiometer for each gun for each of the cells was manually adjusted by observation of the landing registration of the symbol color components, two guns at a time. The voltage at the wiper of the potentiometer was converted into a digital word and substituted for the digital word normally stored and accessed by the convergency circuitry for that cell. When the proper registration was observed, the digital values that produced it were recorded. All the convergence characteristics of each cell was generated in this way and the resulting digital data was stored in PROMS for use by the convergence circuitry in subsequent operation of the CRT.

Because this process of convergence calibration for each gun took place in each of 256 cells, calibration often took more than eight hours. To minimize time in calibration, a smoothing routine was created to linearly extropolate the data between two cells so that only every other cell required manual calibration. Although this resulted in a savings of time of nearly six hours, it also compromised the convergence quality and very often cell by cell data had to be taken at the edges of the screen.

It was reasoned that the linear smoothing model was incorrect and that a parabolic model was more correct. This resulted in needing to take only nine points of data but had the disadvantage of compromising the convergence quality even further. The subjective opinion of each viewer of what constituted adequate convergence led to many recalibrations and served as a major motivation behind developing a new convergence technique.

In addition to the calibration shortcomings, other disadvantages existed. Vertical bars were discernable in the raster near the edges where the quantized convergence distorted the beam placement as it crossed from one cell to the next. The same phenomena manifested itself as "jogs" in stroke generated lines as they passed from one cell to the next. Furthermore, the digital words stored in the PROMS were not easily modified for even the smallest of corrections.

Most other convergence methods developed are inappropriate or inadequate for the high quality resolution required of aircraft Electronic Flight Instrument System (EFIS) displays. Most schemes have their origin in the home television industry, where the convergence quality is lower than is necessary in EFIS and where the only mode of operation is a raster scan. EFIS has the requirement that the display operate both as a high speed raster device and as a stroke or vector monitor. The random nature of the vector mode of operation eliminates schemes where convergence is dependent on an anticipatory knowledge of where the beam is going. Such schemes are ideal in raster systems. These schemes allow smoothing of the digital component of the convergence through a "pre-access" of the next digital word. The digital smoothing can be improved through an increase in the number of cells on the screen but because of the high scan rates of EFIS raster, the limit of digital access times is reached before the solution is effective.

Analog convergence schemes exist and are commonly used. The general problem with these schemes are that they are complex in alignment. Most adjustments are interactive with each other and few can achieve the degree of convergence quality provided by the present invention. Most of the analog schemes divide the screen into regions or sectors and a correction term is generated and applied specifically for that region. This amounts to a piecewise approximation where new terms become active and are added in as the region is entered.

SUMMARY OF THE INVENTION

This invention implements the general equation for correction for each gun in a coordinate system peculiar to each gun. The coefficients of the equation are modified to optimize convergence in each of four screen quadrants but it is the nature of the equations and the choice of the boundary locations that allows each coefficient to be changed only where the term it multiplies is zero. In addition to this, it is the nature of the implementation that there are only nine places on the screen which then totally define the convergence of all four quadrants. A static format of nine triangles is placed at each of these points. Each leg of these triangles has a color which is chosen to optimize the viewability of the convergence of a particular gun.

DESCRIPTION OF THE PREFERRED EMBODIMENT

Figure 1:
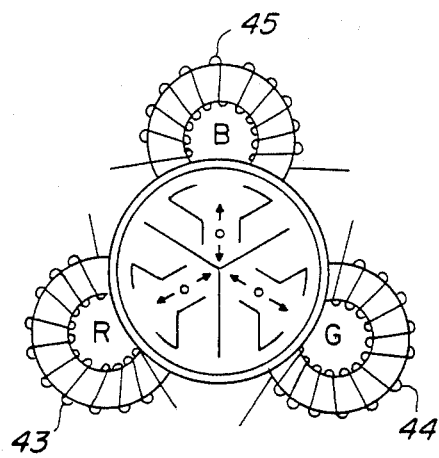
FIG. 1 is a cross-sectional view through the neck of a typical delta-gun CRT at the location of the convergence correction yoke.

Before discussing the apparatus for carrying out the present invention, a discussion of the mathematical basis thereof will be presented to aid in understanding of the invention.

This invention makes use of the general expression of convergence error (e) as a function of radial distance from the CRT screen center.

$$e = \sum_{n=0}^{\infty} a_n r^{2n}$$

An essential aspect of the invention is the interpretation and realization of this expression. The series is truncated at $n=1$ and is expressed electronically in separate coordinate systems for each gun.

Because this invention implements a correction which is identical in form to the nature of the error, it has none of the problems associated with a piecewise approximation such as smooth transitioning. In addition, the quality of convergence is inherently better. The coefficients $a_n$ become the adjustable parameters and each coefficient is adjustable and distinctly isolated from every other coefficient. The truncated series was found to be accurate over a region on the order of 70% of the screen. Since any region of the screen could arbitrarily be converged at the expense of others, it would be reasonable to implement a system where different coefficients were switched in as a function of the region in which the beam was operating.

The essential difference between this and methods of piecewise approximation of the prior art is that the coefficients are only changed when the term it multiplies is zero. This assures a smooth transition because not all the terms' coefficients change at the same time, nor is the coefficient changed when the term is non-zero.

It is the nature of the equation that the coefficients of successively higher order terms of the series be maximal at points where all other terms are zero or are of a lower order and have already been adjusted at a point where they are maximal. This nature links itself to an easy technique of calibration where convergence is adjusted at nine places on the screen; the center (lowest order constant terms), the four on-axis points (top and bottom center, left and right center), and the four corners (See FIG. 4). This second feature, the adjustibility, is also an essential part of the invention for it is what makes the convergence quality repeatable and not operator dependent.

A third aspect of the invention addresses the desire to use a test pattern which reduces the calibration operator's work load. In most systems, the calibrator must switch symbol color manually. Also, the symbol is often a square, a cross, or a dot. This invention uses a triangle corresponding to the delta-gun geometry with different colored legs to maximize the viewability of the convergence error and eliminate any changing of the color symbol.

The general expression for convergence correction current (i) given in the literature is $$i = A + Br^2 + Cr^4 + Dr^6 \ldots$$

or

-continued $$i = \sum_{n=0}^{\infty} a_n r^{2n}$$

It was experimentally found that the blue gun could be converged with the expression of the form:

$$i_B = a_0 + a_1 x^2 + a_2 y^2$$

$$i_B = a_0 + a_1 r^2 = a_0 + a_1 + a_2 y^2$$

while sufficient for the convergence of the blue beam, this convergence function was found to be insufficient for the purposes of convergence of red or green. Because it is assumed that the correction needed for convergence was due to geometry, and since geometry hadn't any preference for blue, the preference must originate in the coordinate system for x and y.

Figure 3:
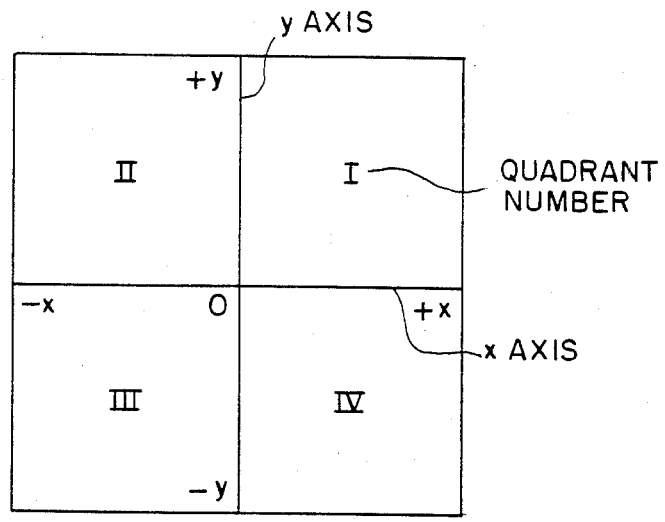
FIG. 3 is a view of the display screen showing its coordinate system.

A circuit is generated which implements the convergence function $$i = a_0 + a_1 x^2 + a_2 y^2$$

in a distinct coordinate system for each gun. The terms x and y for red are written as:

$$X_R = X \cos 120° + Y \sin 120°$$

$$Y_R = -X \sin 120° + Y \cos 120°$$

and the terms x and y for green were written as:

$$X_G = X \cos 240° + Y \sin 240°$$

$$Y_G = -X \sin 240° + Y \cos 240°$$

where the terms x and y are the coordinates of the main deflection, $+Y$ to the top and $+X$ to the right of the screen (see FIG. 3). Thus using an electronic circuit, the terms $X_R$, $Y_R$, $X_G$ and $Y_G$ are created from x and y and the expressions:

$$i_B = A_0 + A_1 X^2 + A_2 Y^2$$

$$i_R = A_0' + A_1' X_R^2 + A_2' Y^2$$

$$i_G = A_0'' + A_1'' X_G^2 + A_2'' Y^2$$

are implemented.

The equations are sufficient to converge nearly 70% of the screen. This system, however, has shortcomings other than the incomplete convergence. It is difficult to think in three different coordinate systems are the coefficients $a_n$ are adjusted. This thinking is necessary because the place on the screen where, for example, $A_1'$ is maximum is not the point at where $A_1$ is maximum.

The expressions are therefore rewritten in terms of x and y alone as follows:

$$i_B = a_0 + a_1 x^2 + a_2 y^2$$

$$i_R = a_0' + a_1'(x \cos 120° + y \sin 120°)^2 + A_2''(-X \sin 120° + Y \cos 120°)^2$$

$$i_G = a_0'' + a_1''(x \cos 240° + y \sin 240°)^2 + A_2''(-X \sin 240° + Y \cos 240°)^2$$

or $$i_B = A_0 + A_1 X^2 + A_2 Y^2$$

$$i_R = A_0' + (A_1' \cos^2 120° + A_2' \sin^2 120°) X^2 +$$

$$2(\cos 120°)(\sin 120°)(A_1' - A_2')XY +$$

$$(A_1' \sin^2 120° + A_2' \cos^2 120°) Y^2$$

$$i_G = A_0'' + (A_1'' \cos^2 240° + A_2'' \sin^2 240°) X^2 -$$

$$2(\cos 240°)(\sin 240°)(A_1 - A_2)XY +$$

$$(A_1'' \sin^2 240° + A_2'' \cos^2 120°) Y^2$$

or $$i_B = A_0 + A_1 X^2 + A_2 Y^2$$

$$i_R = b_0 + b_1 X^2 + b_2 Y^2 b_3 XY$$

$$i_G = c_0 + c_1 X^2 + c_2 Y^2 - c_3 XY$$

The form of these last three expressions indicate that the places where $a_1$ is maximal is also the place where $b_1$ and $c_1$ is maximal which means that one can adjust the coefficients without regard to other coordinate systems. Further, examination and interpretation of the equations indicates that lowest order or constant terms ($_0$) are the static convergence. These terms are set at the center of the screen where there is no deflection.

The second order terms are set on-axis where they are maximal (vertical axis for $y^2$ terms, horizontal for $x^2$ terms). The xy terms then are maximal in the corners.

Another interpretation to be found from this result is that the magnitude and sign of the xy terms indicates the magnitude and direction of rotation from the original coordinate system. This means the coefficient of the xy term for blue is zero in the ideal case but that slight rotational misregistrations between the vertical deflection of the deflection yoke and the vertical radial deflection of the blue gun may require compensation for this misregistration. The form of this blue equation is suggested by the form of the red and green corrections; namely, $$i_B = a_0 + a_1 x^2 + a_2 y^2 \pm a_3 xy$$

If these equations are implemented, again only 70% of the screen can be converged adequately. Since this 70% can arbitrarily be made to encompass any quadrant at the expense of the rest of the screen, it is determined that if new coefficients are substituted into the equations as the beam enters each quadrant of the screen, convergence will be complete.

The natural boundaries suggested by the form of the equations is the axis of the x, y coordinate system. This results in convergence divided into four regions namely, quadrants I, II, III, and IV, (see FIG. 3). It is also reasonable that convergence will be continuous across the boundary. Thus only the coefficients of the terms that are zero at a boundary will change. This suggests that the convergence can be defined by nine screen locations and that a separate adjustment exists for each gun specifically for convergence at each of these nine locations.

The sequence of the adjustments is also evident. Lower order terms always affect higher order terms so that the lower order terms must be set first. Thus, the constant term or static coefficients are adjusted first, followed by the on-axis terms and lastly the corner. The order in which the on-axis or corner terms are converged is arbitrary.

Having now established that each gun has convergence controls at each of the nine points it is necessary to create a test pattern which gives visibility to the convergence quality of each of these points. The equations further suggest that a triangular symbol placed at each of the nine points would be all that is necessary for good convergence determination.

Figure 5:
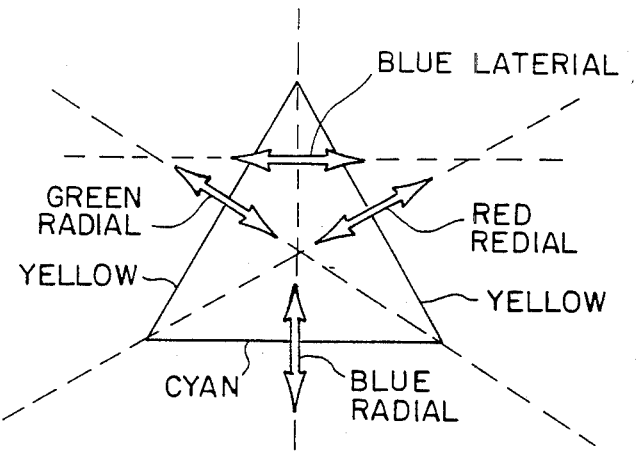
FIG. 5 is a detailed illustration of the convergence symbol.
Figure 2:
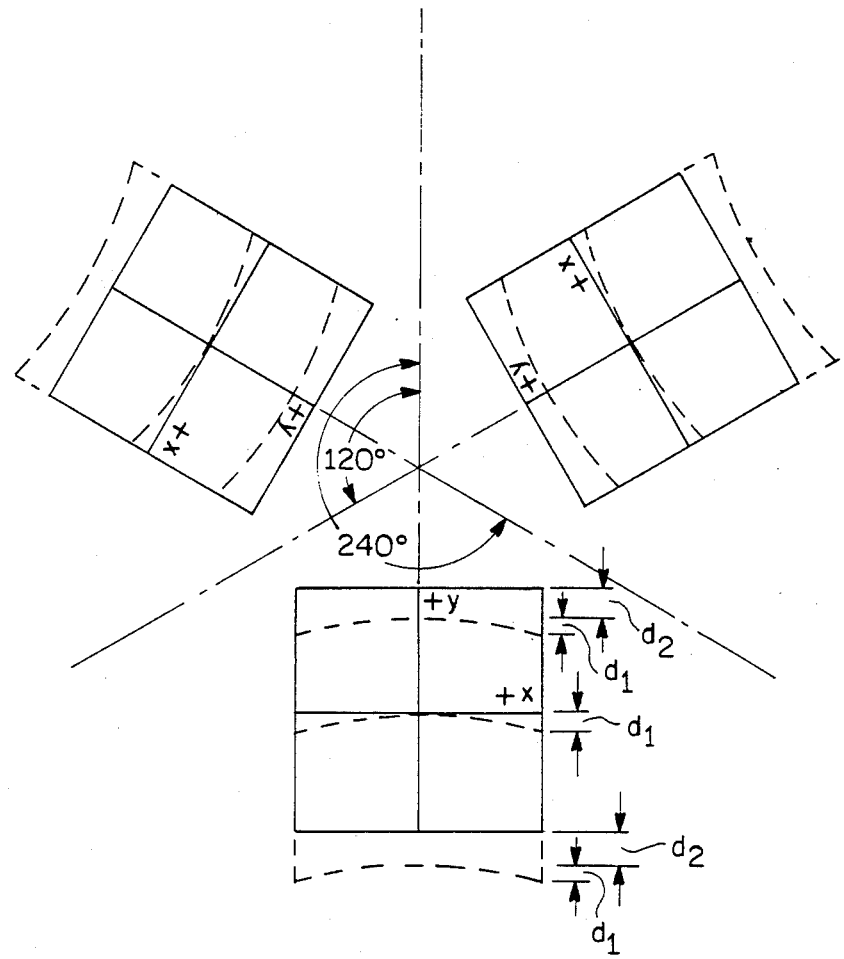
FIG. 2 is a graphical illustration of the the convergence error pattern relative to the converged pattern.

This triangle is illustrated in FIG. 5. It will be noted that it has a leg for each gun running perpendicular to the axis of deflection for that gun. In addition, a vertical line divides the triangle for convergence of blue lateral. The legs perpendicular to the green and red axes of deflection are yellow. This allows red to be converged to green and green to red. When the beams from red and green guns are incident on the same point on the screen this point establishes where the blue gun beam must land. This order is important because only the blue gun has two degrees of freedom of movement (blue radial and blue lateral) which assures that it can now be made to converge to the point established by the intersection of the red and green guns.

Figure 4:
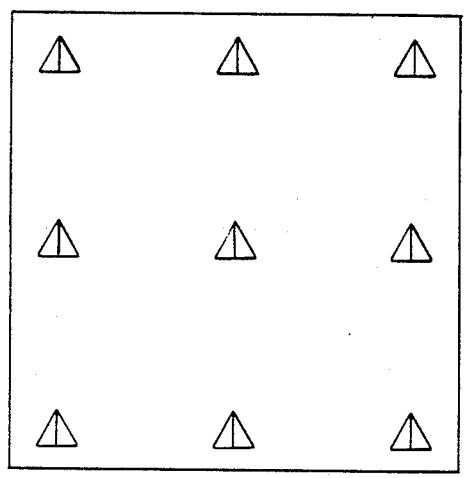
FIG. 4 is a view of the display screen showing the location of the nine convergence symbols of the present invention.

Convergence of the display begins by converging the center triangle of the screen. This static convergence may be accomplished conventionally using permanent magnets or electronically by means of a bias supplied to the convergence yoke coils (FIG. 1) as disclosed in copending application Ser. No. 477,209, filed Mar. 21, 1983 in the name of C. J. Murphy and entitled Convergence Control Apparatus for Color Cathode Ray Tube Display Systems, both applications also being assigned to the present assignees. The operator begins by observing the center triangle as shown in FIGS. 4 and 5. Red and green guns are converged first with the preference to begin with the gun with the most error, although an improper choice would only result in a little more time spent later. This error can be observed for green relative to red on the left diagonal leg of the convergence triangle and the error in red relative to green can be observed on the right diagonal leg of the triangle. This, as mentioned before, is made possible by the choice of yellow for the color of both of these diagonal legs, as yellow, of course, consists of red and green.

Beginning with the gun most in error, that gun is moved through adjustment of the static magnet or electric bias for that gun until the other color component of the leg associated with that gun coincides with the landing of that gun. Then, the other gun viewed on the other leg is adjusted until it also coincides with the first gun. Any movement of the second gun will result in a movement of the reference for the first gun and so the process is repeated until both diagonal legs do not show error. The process of continually reducing the error in an iterative fashion can be somewhat improved upon when the operator learns to judge the effect movement of the first gun will have on the reference for the second gun and vice-versa, and over-correct accordingly. Once both the diagonal legs are converged, the blue gun is converged to the green component by observance of the horizontal cyan colored leg (blue and green guns on). Then the static blue lateral adjustment is moved until the vertical cyan line in the triangle's center is converged.

Once the static convergence is set (lowest order term in each of the above convergence equations), the on-axis points of the screen are converged without any preference given to the order of their convergence. The procedure follows that of static convergence except that, because the blue lateral dynamic correction is performed by the main deflecting yoke, the blue lateral need only be adjusted once, at the center of the screen. In cases where the blue lateral dynamic correction is applied by a device external to the main deflecting yoke, that device would be calibrated at each of the nine places of the screen just as with radial convergence.

Figure 6:
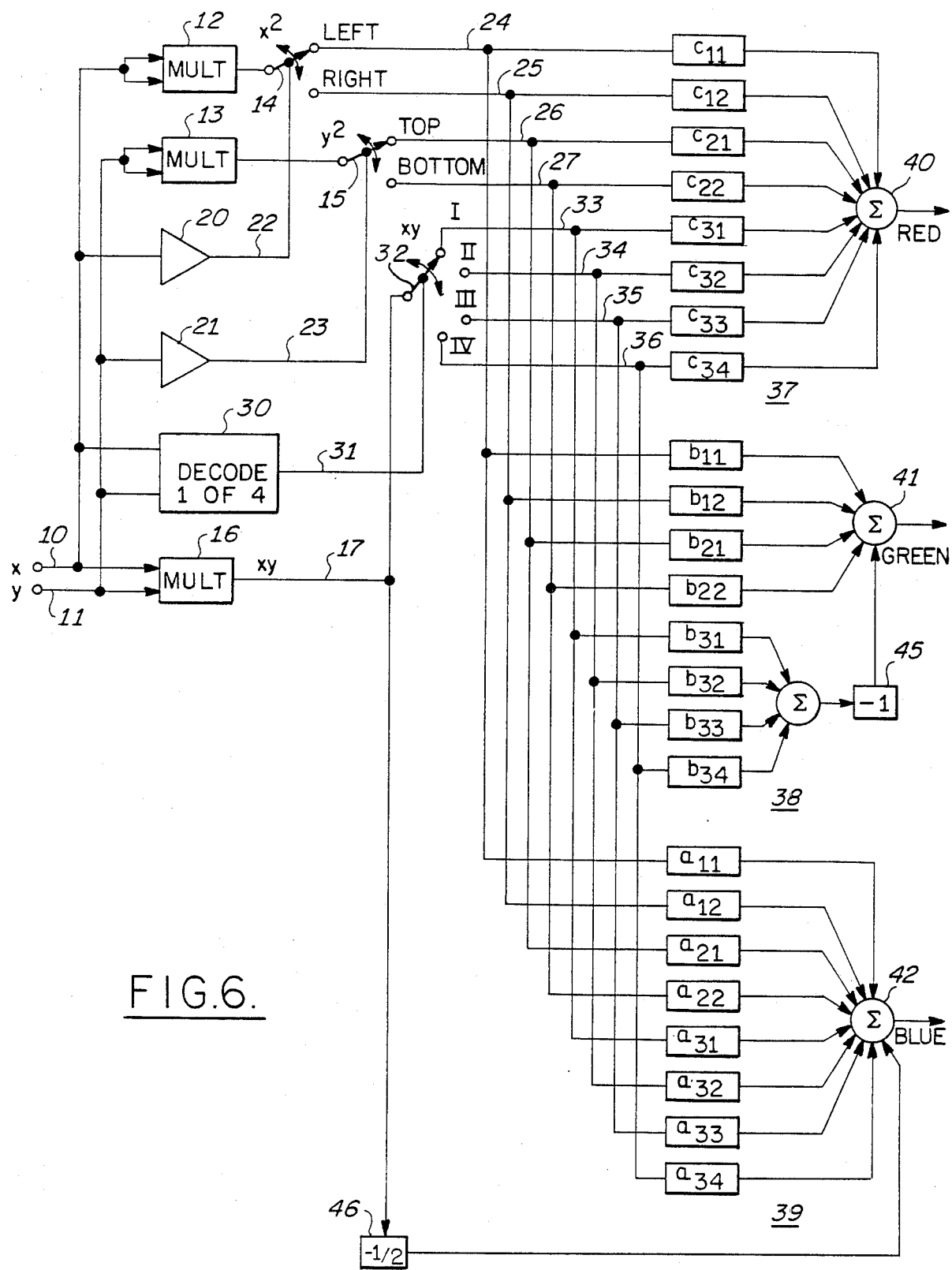
FIG. 6 is a schematic illustration of the convergence correction apparatus of the present invention.

In the following discussion of the convergence of the blue, red and green beams at all other points in the screen; i.e. dynamic convergence, reference will be made to FIG. 6 which is a schematic of the convergence correction apparatus of the present invention. As shown, the x and y positions of the deflected beams, as a set, are determined by the input signals on leads 10 and 11 respectively. In adjusting the convergence correction, these signals are manually set so as to position the convergence symbol of FIG. 4 at the desired nine positions shown in FIG. 4. Of course, after convergence correction is accomplished, these signals correspond to the beam position x,y coordinates of displayed symbology. In a raster type display, these signals are the horizontal and vertical raster sawtooth waves. In stroke written symbology they correspond to the x, y coordinates of the symbol being drawn. In either case, these deflection voltages have signs corresponding to the quadrant to which the beams are to be deflected.

The x and y signals are supplied to multipliers 12 and 13 respectively to provide outside signals proportional to $x^2$ and $y^2$ respectively to switches 14 and 15. The x and y beam position signals are also supplied to multiplier 16 which provide an output signal proportional to x, y on lead 17. The x, y signals on leads 10 and 11 are also supplied to polarity sensors 20 and 21 respectively which provide switch control voltages on leads 22 and 23 corresponding to whether the beams are in the right or left side of the screen for x or whether in the upper or lower side of the screen for y. The x sense amplifier 20 output 22 switches the $x^2$ signal to either of two output loads 24 or 25 when the beams are in the left or right side of the screen respectively while the y sense amplifier 21 output 23 switches the $y^2$ signal to either of two output leads 26 or 27 when the beams are in the top or bottom of the screen. Additionally, the x, y position signals are supplied to a conventional 1-of-4 decoder 30. Decoder 30 supplies an output signal on lead 31 which signal effectively positions the four pole switches 32 to a unique position I, II, III, or IV for each combination of the polarities of the x,y signal output of multiplier 16. These signals appear on leads 33, 34, 35 and 36. It will be understood of course, that while all switches are illustrated as being mechanical for simplicity, conventional solid state devices are used in practice.

All of the foregoing beam positions or variable signals are supplied to resistance trees 37, 38 and 39 associated with each of the red, green and blue summing junctions 40, 41 and 42 respectively. These resistance trees are used to apply the proper value of the coefficients associated with each of the variables as set forth in the three convergence equations. The voltage outputs of the summing junctions 40, 41 and 42 are supplied to conventional voltage-to-current converters (not shown) and applied to the convergence correction coils 43, 44 and 45 of FIG. 1 in the same manner as described in the above referenced Murphy application.

It will be understood that in initially determining the convergence correction, each of the resistances of the resistance trees constitutes an adjustable potentiometer which is replaced by a fixed resistor of the adjusted value.

To understand how to adjust the coefficients of the convergence equations at each of the on-axis points, consider for example, the convergence of the convergence symbol when it is positioned at the upper center on-axis point. When the display is positioning the beam at the top-center of the screen, the switch 15 on $y^2$ in FIG. 6 will be positioned to top lead 26. The switch 14 on $x^2$ and switch 32 on xy are in "don't care" states . . . because at this point on the screen x is zero and thus $x^2$ and xy are zero and the outputs of the switches are zero regardless of the switch position. The signal $y^2$ then is amplified by the term or coefficient $c_{21}$ for red, $b_{21}$ for green and $a_{21}$ for blue. The magnitude of the amplification of the $y^2$ term for each gun is determined by an adjusted resistance value for each gun. This resistance value is recorded for future use. Thus, by adjusting the value of the resistance for each gun, the convergence procedure is identical to that at the center position. As before, several iterations may be necessary to achieve substantially perfect convergence. There is, of course, no need to adjust blue lateral. All of the other coefficient resistances modify signals which are zero. Therefore, the output for red, green, and blue are $c_{21}y^2$, $b_{21}y^2$, and $a_{21}y^2$ only, respectively. The value of the other coefficients are also in a don't-care state.

Convergence of all the on-axis points is conducted similarly, that is, there is a single resistance which is used to control the landing of a single beam for all three guns and no other resistance has an effect on the beam landing at that point.

The off-axis, or corner convergence is set in a similar fashion to on-axis terms except that in the corners the $y^2$ and $x^2$ terms are not zero. Still, however, the convergence of each corner point is set by a single resistor for each gun, it is only the case that the state of the other resistors are of a do-care condition. The other resistors have been set by convergence of the on-axis points and for this reason the on-axis points must be converged before beginning convergence of the corners.

To understand how the circuitry excludes some coefficients to interact with others, consider the case of convergence of the upper right portion of the screen. In this case, the $x^2$ switch 14 is in the right position, the $y^2$ switch 15 is in the top position, and the amplitude of both these signals is near the limit of its range. The switch 32 on xy is positioned to the position marked I. For red, since the value of the terms $c_{12}$ and $c_{21}$ have been determined by convergence of the right-center and top-center points already, the convergence is controlled strictly by $c_{31}$ since no other signals can be summed with these signals. Likewise, for green, $b_{12}$ and $b_{21}$ have been chosen and convergence of the green gun is regulated by adjustment of the coefficient $b_{31}$. This signal $b_{31}xy$ is then inverted by the inverter 45 ($-b_{31}xy$) as required by the equation for green convergence described earlier. Also, in a likewise fashion, $a_{12}$ and $a_{21}$ have been chosen and convergence of the blue gun is regulated by the coefficient $a_{31}$. This signal is used to offset the signal $-xy$ from inverter 46 which is summed to the blue summing point. In this way the coefficient on the blue xy term can be made positive ($a_{31} > \frac{1}{2}$) and negative ($a_{31} < \frac{1}{2}$) or zero ($a_{31} = \frac{1}{2}$) as required to implement the equation for blue convergence described earlier.

With the apparatus of the present invention, convergence can be set with a single pattern without changing symbol colors or position, in a fashion that is logical and efficient inasmuch as any point having been converged in the proper sequence, will not require further correction later in the sequence, and the sequence never retraces itself. The natural extension of this procedure lends itself well to systems which do not have lateral compensation designed into the main deflection yoke, but have an external correcting device which requires calibration of blue lateral at each of the nine screen points. In addition, the convergence symbol triangles used in the test pattern are applicable to any delta-gun convergence pattern, regardless of the convergence system employed.

While the invention has been described in its preferred embodiments, it is to be understood that the words which have been used are words of description rather than of limitation and that changes may be made within the purview of the appended claims without department from the true scope and spirit of the invention in its broader aspects.

I claim:

1. A method for achieving convergence correction of a delta-gun cathode ray tube display having a display screen and primary deflection means responsive to signals for deflecting the beams of said guns in a rectilinear coordinate system of said display screen, said method comprising:
   a. deriving a set of convergence correction equations in terms of said coordinate system, of the form $i = a_0 + a_1x^2 + a_2y^2 \pm a_3xy$, each equation having coefficients peculiar to the angular location of at least one of said guns relative to said screen coordinate system,
   b. implementing said equations in circuits responsive to said deflection means signals and including a plurality of variably adjustable means corresponding to each coefficient of each of said equations,
   c. positioning a convergence correction symbol having linear elements related to the relative positions of said guns at discrete positions in said screen coordinate system, each of said elements characterized by a predetermined color composite of at least two color guns,
   d. separately adjusting said coefficient adjusting means of each equation to effect convergence of the gun beams associated with each element of said symbol at each of said discrete symbol positions and,
   e. selecting the boundary locations of said coordinate system such that each equation coefficient ($a_0$, $a_1$, $a_2$, $a_3$) is changed only when the variable (x, y) it multiplies has a value of zero.

2. The convergence correction method as set forth in claim 1 further comprising
   a. selecting said coordinate system such that said screen is divided into four equal beam deflecting quadrants defined by a horizontal x, $-x$ axis and a vertical y, $-y$ axis and defining said equation variables in terms of x and y beam deflections and said coefficients in terms of a, b and c corresponding respectively to the angular position of said blue, green and red guns relative to said x and y axes.

3. The conversion correction method as set forth in claim 2 wherein said blue gun lies in the plane of said y-axis, said red gun lies in a plane 120° displaced from said blue gun and said green gun lies in a plane 240° disposed from said blue gun and wherein said separation equations are of the form $$i_B = a_0 + a_1 x^2 + a_2 y^2 \pm a_3 xy$$

$$i_R = b_0 + b_1 x^2 + b_2 y^2 + b_3 xy$$

$$i_G = c_0 + c_1 x^2 + c_2 y^2 - c_3 xy$$

wherein
 a. represents adjustable coefficients for converging said blue beam at said symbol location,
 b. represents adjustable coefficients for converging said red beam at said symbol location, and
 c. represents adjustable coefficients for converging said green beam at said symbol location.

4. The convergence correction method as set forth in claim 1 further consisting in
 a. forming the elements of said convergence correction symbol into the shape of an equilateral triangle having their respective sides perpendicular to the convergence correction deflection direction of said blue, red and green guns respectively.

5. The convergence correction method as set forth in claim 4 further consisting in
 a. selecting a first color for two of said symbol elements regarding but two of said guns to produce, and
 b. selecting a second color for the third of said symbol elements requiring one of said two guns and the other of said guns to produce.

6. Convergence correction apparatus for a delta-gun color cathode ray tube display having primary signal responsive deflection means for positioning the electron beams of said guns in a primary horizontal and vertical coordinate system of the screen of said tube and convergence correction means for positioning each beam of each gun in a secondary coordinate system peculiar to that gun's location relative to said primary coordinate system, said apparatus comprising
 a. means for supplying signals proportional to the horizontal and vertical deflection signals of said primary deflection means,
 b. first multiplying means responsive to each of said horizontal and vertical deflection signals for supplying signals respectively proportional to the square thereof,
 c. second multiplying means responsive to said horizontal and vertical deflection means for supplying a signal proportional to the product thereof,
 d. first and second switch means responsive to said horizontal and vertical deflection signals for supplying said horizontal and vertical squared signals to eacn of said beam's convergence correction means dependent upon a predetermined plurality of locations of said beams in said primary coordinate system,
 e. third switch means responsive to each of said horizontal and vertical deflection means for supplying said product signal to each of said beam's convergence correction means dependent upon a predetermined plurality of locations of said beams in said primary coordinate system, and
 f. means responsive to each of said signals supplied to each of said beam's convergence correction means for effectively converting each of said signals in said primary coordinate system to corresponding signals in said secondary coordinate system.

7. The convergence correction apparatus as set forth in claim 6 wherein each of said last mentioned means corresponds to each of said predetermined beam location in said primary coordinate system.

8. The convergence correction apparatus as set forth in claim 7 wherein each of said last mentioned means comprises means for modifying the magnitude of each of said signals.

9. The convergence correction apparatus as set forth in claim 8 wherein each of said signal modifying means comprises an impedance means.

10. The convergence correction as set forth in claim 7 wherein said display screen is rectangular, said primary coordinate system is rectilinear and said predetermined locations are at the right and left center, upper and lower center and at each of the corners of said display screen.

11. A display symbol for use in correcting the convergence of the electron beams of a delta-gun color cathode ray tube display wherein said delta-gun includes electron beam emitters for exciting when properly converged the corresponding blue, red and green phosphor dots of the display screen and located at the apexes of an equilateral triangle, and convergence correction electrodes for deflecting each of said beams in a direction normal to the sides of said equilateral triangle, said display symbol comprising
 three lines of predetermined length relatively oriented to each other so as to form an equilateral triangle, the apexes of which correspond to the relative angular positions of said electron guns,
 two of said lines being generated by the excitation of two of said electron guns and the third of said lines being generated by the excitation of one of said two electron guns and the other of said electron guns.

12. The display symbol as set forth in claim 11 wherein said two lines are generated by exciting said guns corresponding to said red and green dots and the other line by the excitation of one of said guns corresponding to said red and green dots and the gun corresponding to said blue dot.

* * * * *